United States Patent Office 3,525,746
Patented Aug. 25, 1970

3,525,746
PERFLUOROALKYL-SUBSTITUTED s-TRIAZINES
John A. Young, Greenwood Village, Colo., and Robert L. Dressler, Hays, Kans., assignors to the United States of America as represented by the Secretary of the Air Force
No Drawing. Filed Apr. 5, 1968, Ser. No. 719,228
Int. Cl. C07d 55/12, 55/18, 55/22
U.S Cl. 260—249.6                     4 Claims

ABSTRACT OF THE DISCLOSURE

A method for synthesizing perfluoroalkyl-substituted s-triazines which involves a fluoride catalyzed reaction between a polyfluoro-1,3,5-triazine and a perfluoro compound containing carbon-carbon or carbon-nitrogen unsaturation. The reaction effects a replacement of one or more fluorine atoms of the fluoro-triazine compound with perfluoroalkyl groups. The extent of the perfluoroalkyl replacement is controlled by the molar ratios of the two reactants and by the reaction conditions. This method finds utility in providing a one-step process for the synthesis of perfluoroalkyl compounds which in turn are useful as high temperature lubricants and hydraulic fluids.

BACKGROUND OF THE INVENTION

This invention relates to a method for preparing perfluoroalkyl-substituted s-triazines and to the products produced thereby. In a more particular manner, this invention concerns itself with a method which provides for the convenient introduction of perfluoroalkyl groups into the heterocyclic ring structure of a triazine compound.

Perfluoroalkyl-substituted fluorotriazines have previously been prepared in a variety of ways which have been generally characterized by the thermal trimerization of perfluoronitriles or perfluoroimidoylamidines. Other methods involve the ring closure of perfluoroimidoylamidines with acid chlorides or acid anhydrides. These methods, however, involved laborious and indirect multistep processes and, furthermore, were not effective in accomplishing the attachment or introduction of functionally active perfluoroalkyl side chains into a triazine ring structure.

In atempting to overcome the problems and disadvantages prevalent with the multistep processes utilized heretofore, it has been found that a fluoride catalyzed reaction between fluorotriazines and perfluoro compounds having carbon-carbon or carbon-nitrogen unsaturation provides an efficient one-step process for the synthesis of perfluoroalkyl compounds.

SUMMARY OF THE INVENTION

In accordance with the present invention, it has been found that perfluoroalkyl or functionally substituted perfluoroalkyl groups can be attached or introduced into the heterocyclic ring structure of fluorotriazine compounds. Attachment is effected by means of a direct one-step process involving a reaction between an unsaturated perfluoroalkyl compound and an aromatic compound containing an active fluoride atom in the presence of an alkali metal fluoride catalyst. The process of the invention provides a simple and economical means for synthesizing perfluoroalkyl fluorotriazines in high yield. The reaction products synthesized by the method of this invention are especially useful as high temperature lubricants and hydraulic fluids and as synthetic intermediates for polymer formation.

Accordingly, the primary object of this invention is to provide a method for the synthesis of perfluoroalkyl fluorotriazines.

Another object of this invention is to provide a method for reacting a perfluoro compound containing carbon-carbon or carbon-nitrogen unsaturation with an s-triazine compound containing an active fluorine atom in the presence of an alkali metal fluoride catalyst.

Still another object of this invention is to provide a simple, direct and economical one-step method for synthesizing perfluoroalkyl fluorotriazines in relatively high yield.

The above and still further objects of this invention will become apparent upon consideration of the following detailed description of the preferred embodiments thereof.

DESCRIPTION OF THE PREFERRED EMBODIMENTS

In the process of this invention, it has been found that perfluoroalkyl groups can be conveniently attached to heterocyclic ring structures of the triazine type. In one embodiment, the reaction of cyanuric fluoride, or 2,4,6-trifluoro-1,3,5-triazine, with perfluoropropene in the presence of cesium fluoride resulted in the replacement of one, two or three fluorine atoms of the cyanuric fluoride by perfluoroisopropyl groups. To be more specific, when cyanuric fluoride was heated under autogenous pressure with perfluoropropene and cesium fluoride at 100° for 12 hours, it was converted almost quantitatively (>90%) to a mixture of mono-, bis-, and tris(perfluoroisopropyl)-triazines, easily separable by fractionation. Although three compounds were formed, the reaction could be directed toward any one of the three by altering the reactant ratio. With a $C_3F_6$:$(CNF)_3$ ratio of approximately 2:1, the ratio of mono-, di-, and trisubstitution products was 8:10:1, while a reactant ratio of 1:1.25 led to a product ratio of 28:6:1.

All of the products showed the characteristic triazine absorption band near 1550 cm.$^{-1}$. Both the complexity of this band and its intensity relative to absorption by the $(CF_3)_2CF$ groups decreased with the increasing degree of substitution. In nuclear magnetic resonance (NMR) spectra, chemical shifts for the ring fluorine, the $CF_3$ of $(CF_3)_2CF$ and the CF of $(CF_3)_2CF$ were, respectively, 30.4–30.6, 74.4–75.4, and 183.8–186.5 p.p.m. upfield from $CFCl_3$, as perfluoroisopropyl groups were added. Fine structure and area ratios for the three different types of fluorine were consistent with the assigned structures.

The process of the invention is not limited to compounds having carbon-carbon unsaturation such as perfluoropropene since, in a further embodiment, compounds containing unsaturation other than carbon-carbon can also be utilized. Perfluoro-2-azapropene ($CF_3N$=$CF_2$) reacted with cyanuric fluoride in a manner entirely analogous to that of perfluoropropene and produced a mixture of mono-, bis-, and tris(perfluorodimethylamino)-substituted triazines, a 2:1 $CF_3N$=$CF_2$:$(CNF)_3$ ratio giving a product ratio of 1:2:1. Infrared spectra showed the same sequential behavior of the 1550-cm.$^{-1}$ band as with the perfluoroisopropyl series; in the monosubstituted compound this band was a multiplet, in the disubstituted compound a doublet, and in the symmetrical trisubstituted compound a singlet. NMR spectra showed peaks for the $(CF_3)_2N$ and ring fluorine atoms at 55.1, 55.0, and 32.4, 32.9 p.p.m., relative to $CFCl_3$, for the mono- and disubstituted compounds, while the trisubstituted compound showed only a 55.2-p.p.m. peak. Area ratios for (side chain:ring) fluorine were in the correct ranges, 6:2 and 12:1, respectively. As was the case with the perfluoroisopropyl series, the trisubstituted compound was a low-melting solid.

In an extension of the catalyzed perfluoroalkylation reaction, functionally active perfluoroalkyl side chains can be introduced into a triazine ring in the same manner, as long as these functions are inert to fluoride ion. Perfluoroallyl cyanide, made by dehalogenation of $$CF_2\text{-}ClCFClCF_2CN$$

reacted under the same conditions with a slight excess of 2,4-bis (perfluoroisopropyl)-6-fluoro-s-triazine to give a 62% yield of perfluoro-[2-(β-cyanoisopropyl)-4,6-diisopropyl]triazine.

This reaction leads to the replacement of the active fluorine atom by nitriloperfluoroalkyl groups. The reaction succeeds even when migration of the terminal double bond to an internal position would be expected, as shown by the reaction above, or when the unsaturated compound would be expected to dimerize, as shown by the reaction of perfluoro-2-azapropene described heretofore.

The specific practice of this invention is illustrated in the following examples:

EXAMPLE 1

Perfluoroalkylation of cyanuric fluoride

Cesium fluoride (50 g.) was dried in an autoclave at 200–300° overnight under continuous evacuation. The bomb was cooled and loaded by vacuum transfer with 45 g. (0.33 mole) of cyanuric fluoride and 87.5 g. (0.58 mole) of hexafluoropropene, then sealed and rocked at 100° for 16 hours.

The cooled bomb was vented into an evacuated system, giving <1 g. of volatile material. The crude product was decanted and the residual solid extracted with Freon 113, 126 g. (95%) of the initial 132.5 g. being recovered. The material was fractionated through a 1-ft. column of metal helices to give the monoalkylated product in 39% conversion, the dialkylated product in 51% conversion, and the trialkylated product in 5% conversion.

Although the structures of all three compounds were established unequivocally by NMR and infrared spectra, elemental analysis of the mono- and dialkylated products were unsatisfactory except for nitrogen values, possibly because of hydrolysis of the very moisture-sensitive ring fluorine atoms since the trialkylated product gave satisfactory results.

*Analysis.*—Calc'd for $C_{12}F_{21}N_3$ (percent): C, 24.6; F, 68.2; N, 7.2. Found (percent): C, 24.6; F, 68.0; N, 7.3.

EXAMPLE 2

Perfluorodimethylamination of cyanuric fluoride

A pressure vessel containing 50 g. of dried cesium fluoride was loaded, as described above, with 10 g. (0.075 mole) of cyanuric fluoride and 20 g. (0.15 mole) of perfluoro-2-azapropene. After agitation at 110° for 26 hours it was evacuated through a cold trap for 6 hours. The residual material was extracted with two 25-ml. portions of Freon 113, the solvent was removed, and the liquid residue was combined with that obtained during the evacuation. Fractionation through a vacuum-jacketed Vigreux column gave, in addition to intercuts, 3.8 g. (19% conversion) of the monosubstituted compound, 8.5 g. (29% conversion) of the disubstituted compound, and 4.3 g. (16% conversion) of the trisubstituted compound, all at least 88% pure. Since no extraneous peaks appeared in chromatograms of any of the intercuts, and material balance was good, the apparent conversion figures would be raised appreciably by more efficient separation.

EXAMPLE 3

Cyanoperfluoroalkylation of 2,4-bis(perfluoroisopropyl)-6-fluoro-s-triazine

A pressure vessel containing 10 g. of dried cesium fluoride was loaded by siphoning in under partial vacuum 14 g. (0.032 mole) of the above triazine and adding by vacuum transfer 4.5 g. (0.028 mole) of perfluoroallyl cyanide. It was then sealed and rocked for 24 hours at 100°. The crude product was decanted, combined with Freon 113 extracts of the residual solid, and fractionated to give 10.4 g. (61.5%) of the addition product.

*Analysis.*—Calc'd for $C_{13}F_{20}N_2$ (percent): C, 26.4; N, 9.5. Found (percent): C, 26.7; N, 9.8.

In the examples, cyanuric chloride could be substituted for cyanuric fluoride since the former is converted to the latter by alkali metal fluoride. Obviously, this technique would require the use of sufficient fluoride for both halogen exchange and catalysis.

The physical constants of the substituted triazine products of the examples are given in Table I.

TABLE I.—PHYSICAL CONSTANTS OF SUBSTITUTED TRIAZINES

| Example: | Position 2 | Position 4 | Position 6 | B.P., °C.(mm.) | Refractive index $n_{D}{}^{2}$ |
|---|---|---|---|---|---|
| 1 | i—$C_3F_7$ | F | F | 99–100 (630) | 1.3131 |
|  | i—$C_3F_7$ | i—$C_3F_7$ | F | 125–126 (630) | 1.3373 |
|  | i—$C_3F_7$ | i—$C_3F_7$ | i—$C_3F_7$ | [1] 137–138 (630) |  |
| 2 | $(CF_3)_2N$ | F | F | 108–109 (630) | 1.3477 |
|  | $(CF_3)_2N$ | $(CF_3)_2N$ | F | 73–75 (40) | 1.3485 |
|  | $(CF_3)_2N$ | $(CF_3)_2N$ | $(CF_3)_2N$ | [2] 90 (40) |  |
| 3 | $CF(CF_3)CF_2CN$ | i—$C_3F_7$ | i—$C_3F_7$ | 79–80 (20) | 1.3266 |

[1] M.P. 30–31. [2] M.P. 47–48.

The NMR chemical shifts of the perfluoroisopropyl substituted triazines from Example 1 are presented in Table II together with the NMR chemical shift of cyanuric fluoride.

TABLE II.—NMR CHEMICAL SHIFTS (σ) IN SUBSTITUTED TRIAZINES [1]

| Compound | Substituents of 1,3,5-triazine in position 2 | 4 | 6 | $\overset{CF_3}{\underset{CFCF_3}{|}}$ | $\overset{C}{\underset{CF_3CF_3}{|}}\overset{F}{\underset{}{|}}$ | $\overset{F}{\underset{T}{|}}$ |
|---|---|---|---|---|---|---|
| Cyanuric fluoride | F | F | F |  |  | 20.8 |
| Example 1 | i—$C_3F_7$ | F | F | 74.4 | 188.8 | 30.4 |
|  | i—$C_3F_7$ | i—$C_3F_7$ | F | 75.6 | 187 | 30.6 |
|  | i—$C_3F_7$ | i—$C_3F_7$ | i—$C_3F_7$ | 75.4 | 186.5 |  |

[1] $CCl_3F$ as internal standard (σ=0). T=triazine ring.

The process of this invention provides a substantial improvement in the synthesis of perfluoroalkyl fluorotriazines, thus making available a number of useful compounds. The compounds find utility as hydraulic fluids in the 450°–475° F. range and as high temperature lubricants. They are also useful as synthetic intermediates for polymer formation. This highly efficient, direct and one-step process provides a means for synthesizing useful compounds which could be accomplished heretofore only through laborious and indirect multistep processes.

While the invention has been described with particularity in reference to specific embodiments thereof, it is to be understood that the disclosure of the present invention is for the purpose of illustration only and is not intended to limit the invention in any way, the scope of which is defined by the appended claims.

What is claimed is:

1. Perfluoro - [2 - (β-cyanoisopropyl)-4,6-diisopropyl]-1,3,5-triazine.

2. 2-(perfluorodimethylamino)-4,6-difluoro-1,3,5-triazine.

3. 2,4-bis(perfluorodimethylamino)-6-fluoro-1,3,5-triazine.

4. 2,4,6-tris(perfluorodimethylamino)-1,3,5-triazine.

References Cited

UNITED STATES PATENTS

| | | | |
|---|---|---|---|
| 2,603,663 | 7/1952 | Feasley et al. | 260—653.1 XR |
| 2,845,421 | 7/1958 | Grundmann et al. | 260—248 |
| 2,981,734 | 4/1961 | Ratz et al. | 260—248 |
| 3,240,825 | 3/1966 | Hauptschein et al. | 260—653.1 |
| 3,283,020 | 11/1966 | Parsons | 260—653 |
| 3,308,175 | 3/1967 | Barr | 260—653.1 |
| 3,369,002 | 2/1968 | Griffin | 260—248 XR |

OTHER REFERENCES

Patai (ed.): "The Chemistry of Alkenes," Interscience Pub., New York (1964), pp. 586–91 and 604–5.

HENRY R. JILES, Primary Examiner

J. M. FORD, Assistant Examiner

U.S. Cl. X.R.

252—78, 51; 260—248, 249.5, 249.8